(12) United States Patent
Steely, Jr. et al.

(10) Patent No.: US 6,961,825 B2
(45) Date of Patent: Nov. 1, 2005

(54) CACHE COHERENCY MECHANISM USING ARBITRATION MASKS

(75) Inventors: Simon C. Steely, Jr., Hudson, NH (US); Stephen Van Doren, Northborough, MA (US); Madhumitra Sharma, Shrewsbury, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 986 days.

(21) Appl. No.: 09/768,418

(22) Filed: Jan. 24, 2001

(65) Prior Publication Data

US 2002/0099833 A1    Jul. 25, 2002

(51) Int. Cl.$^7$ ............................................. G06F 12/00
(52) U.S. Cl. ...................... 711/141; 711/147; 709/213; 709/238
(58) Field of Search ............................... 711/141, 147; 709/213, 238

(56) References Cited

U.S. PATENT DOCUMENTS

| | | | |
|---|---|---|---|
| 5,003,459 A | 3/1991 | Ramanujan et al. | |
| 5,197,146 A | 3/1993 | LaFetra | |
| 5,303,362 A | 4/1994 | Butts, Jr. et al. | |
| 6,049,851 A | 4/2000 | Bryg et al. | |
| 6,421,712 B1 * | 7/2002 | Koren | 709/213 |
| 6,546,465 B1 | 4/2003 | Bertone | |
| 6,636,948 B2 | 10/2003 | Steely, Jr. et al. | |
| 6,654,858 B1 | 11/2003 | Asher et al. | |
| 6,671,792 B1 | 12/2003 | McAllister | |
| 6,745,299 B2 | 6/2004 | Bushey et al. | |
| 6,748,498 B2 | 6/2004 | Gharachorloo et al. | |
| 6,751,710 B2 | 6/2004 | Gharachorloo et al. | |
| 6,751,721 B1 * | 6/2004 | Webb et al. | 712/10 |

OTHER PUBLICATIONS

Patterson et al., Computer Architecture A Quantitative Approach, Second Edition 1996 (First Edition 1990) pp. ix-xii and 654-685, Morgan Kaufmann Publishers, Inc., San Francisco, California.

* cited by examiner

Primary Examiner—Jack Lane

(57) ABSTRACT

A distributed processing system includes a cache coherency mechanism that essentially encodes network routing information into sectored presence bits. The mechanism organizes the sectored presence bits as one or more arbitration masks that system switches decode and use directly to route invalidate messages through one or more higher levels of the system. The lower level or levels of the system use local routing mechanisms, such as local directories, to direct the invalidate messages to the individual processors that are holding the data of interest.

17 Claims, 4 Drawing Sheets

CACHE COHERENCY MECHANISM USING ARBITRATION MASKS

BACKGROUND OF THE INVENTION

1. Field of the Invention

This invention relates generally to distributed shared memory multiprocessor computer systems and, more particularly, to cache coherency mechanisms for such systems.

2. Background Information

Distributed shared memory computer systems, such as symmetric multiprocessor (SMP) systems, support high-performance application processing. Conventional SMP systems include a plurality of processors coupled together by a bus. Recently, SMP systems have also coupled the processors together over a network. One characteristic of SMP systems is that memory space is shared among all of the processors, that is, each processor may access programs and data that are stored in the shared memory.

One or more operating systems are typically stored in the shared memory. The operating systems control the distribution of processes or threads among the various processors. The operating system kernels may execute on any processor, and may even execute in parallel. Accordingly, many different processors may execute various processes or threads simultaneously, and the execution speed of a given application may be greatly increased.

A processor in an SMP system also typically controls at least one level of associated cache memory. When the processor utilizes data from the shared memory, the processor typically holds an image, or copy, of the data in the associated cache. The processor thus avoids the delays associated with having to go to the shared memory each time the processor requires access to the data. The cache memories of two or more processors may contain overlapping or identical copies of data. If one of the processors alters its copy of the data, the copies of the data in the caches of other processors become invalid. To prevent the processors from acting on invalid, i.e., inconsistent, data, the SMP systems utilize some type of cache coherency protocol.

The cache coherency protocol provides a mechanism to keep track of which processors have copies of particular data, and also to notify the processors that are holding the copies that a given processor is going to update, or modify, the data. When the affected processors receive notice of the impending update operation, the processors invalidate their copies of the data. Thereafter, when one of the affected processors requires the data for further processing, the processor must first obtain a copy of the valid data from the updating processor.

In a directory based system, a "home node" maintains for an associated region of memory a cache coherency directory that indicates which processors have copies of the data in their caches. One processor will be listed in the directory as the "owner" of the data. As owner, the processor holds a valid copy of the data and has control of the data. In order for another processor to update the data, the processor must first become the owner of the data. Accordingly, the non-owner processor contacts the home node as part of an update operation and the home node grants a change in the ownership of the data. The new owner then updates the data, after, as necessary, obtaining a valid copy of the data from the previous owner. The home node also notifies the other processors that have copies of the data that their copies are now invalid.

The operations of the system must be coordinated with the time it takes to notify the processors about impending update operations, that is, with the time it takes to send an invalidate message to the affected processors. Otherwise, one or more of the processors may end up using invalid copies of the data in their processing operations. As the number of processors included in the system increases, it becomes more and more difficult to provide the invalidate messages to the affected processors in a timely manner. Accordingly, system operations may be adversely affected.

One type of known cache coherency mechanism uses "presence bits" to indicate which processors have copies of the data. The mechanism includes in the cache coherency directory for each data entry a number of bits that correspond to the respective processors in the system. For a given entry, the system sets the bits that correspond to the processors that have copies of the data.

When the data are to be updated, the system uses the associated presence bits to enter one or more network routing tables in order to multicast an invalidate message from the home node to each of the indicated processors. When an intermediate switch receives the message, the switch consults stored routing tables and forwards the message along designated routes leading to the affected processors that are accessible from the switch. The message is thus delayed at every switch, and the associated delays become longer as the numbers of processors and/or switches increase.

Larger systems may be organized in multiple-processor groups. In one such prior known system the processors in a given group communicate over the network through a group switch. In this system, the cache coherency mechanism uses "sectored presence bits" that correspond to the respective groups. The system sets a bit in a given entry to indicate that one or more processors in the corresponding group have copies of the data.

As part of an update operation, the home node uses the sectored presence bits to enter the associated routing tables and multicasts the invalidate messages along routes to the corresponding group switches. Intermediate switches similarly consult routing tables to forward the message along the routes. A node in each group may maintain a group cache coherency directory and use the information therein to direct the invalidate message to the individual affected processors. Alternatively, the group switch may locally broadcast the message to all of the processors in the group.

The sectored presence bits work well for systems with relatively small numbers of groups, with the various switches routing messages to the relatively few group switches. However, as the number of groups increases, the mechanism suffers from the same problems discussed above with reference to the use of the presence bits.

SUMMARY OF THE INVENTION

The invention is a cache coherency mechanism that essentially encodes network routing information into the sectored presence bits. The mechanism organizes the sectored presence bits as one or more arbitration masks. The system switches use the masks directly to efficiently route invalidate message through one or more higher levels of the system. Accordingly, the switches need not enter their network routing tables. The lower level or levels of the system use local routing mechanisms, such as local directories, to direct the invalidate messages to the individual processors that are holding the data of interest. The messages thus travel through the system and, in particular, the system switches, without the delays associated with entering the larger network routing tables.

As an example, a multi-level switching system includes a plurality of central switches that connect to a plurality of group switches. Each group switch, in turn, connects to multiple individual processors. The system thus has two higher levels, or layers, is namely, a first layer of interconnection among the central switches and a second layer of interconnection between the central switches and the group switches. The system also has a lower level of interconnection, between the group switches and the respective processors. To route the messages from the home node to the group switches, that is, through the higher levels of the system, the cache coherency mechanism maintains two levels of arbitration masks.

A first-level arbitration mask is associated with the routes to the various central switches from the associated home node. In the example, the routes from the home node start at an associated home port on one of the central switches, hereinafter the "home switch," and the mask includes a bit for each home switch port that leads to another central switch. A set bit in the mask indicates that the invalidate message is to be multicast through the corresponding port.

A second-level arbitration mask is associated with the routes from the central switches to the group switches. The mask includes bits that correspond to the ports of the central switches that lead to the respective group switches, and a set bit in the second-level mask indicates that the invalidate message is to be routed through the corresponding port. By properly setting the bits in the two levels of masks, the system directly provides routing information for multicasting the invalidate messages from the home port through the central switches to the group switches. The group switches may then use local directories, local arbitration masks or local broadcasts to direct the invalidate messages to the affected processors.

In one embodiment the system saves storage space at the various home nodes by using a combined second-level arbitration mask, rather than individual masks for the respective central switches. The set bits in the combined second-level mask represent a combination, i.e. an "OR," of the routes from the respective central switches to the various group switches of interest. The system then multicasts the invalidate message over the same ports of every central switch, and may end up sending the message to one or more groups that do not contain processors with copies of the data of interest. The system thus trades off the reduced storage requirements with an increase in message traffic.

With other system configurations, additional levels of arbitration masks may be used to convey the necessary routing information. The result is a system that uses fewer system resources, and thus incurs fewer associated delays, to send invalidate messages through the system.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
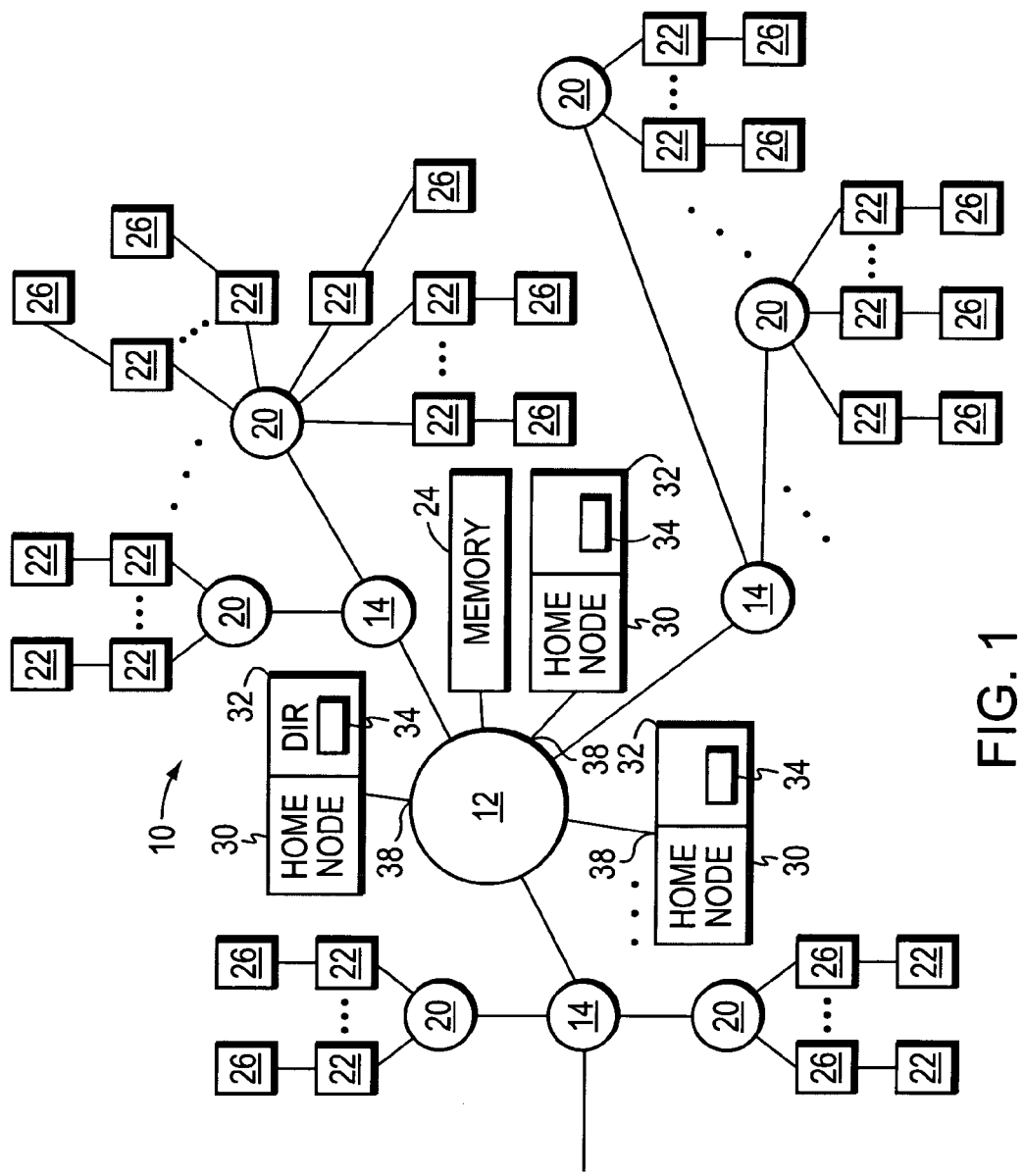
FIG. 1 is a functional block diagram of a system constructed in accordance with the invention.

Referring to FIG. 1, a plurality of processors 22 in a distributed shared memory system communicate over a network 10 that includes a central switch 12, intermediate switches 14 and group switches 20. The processors also share access to a main memory 24 over the network 10.

The system is directory-based and includes for each region of memory an associated "home node," or processor, 30 that maintains system directories 32 for the region. Each home node communicates with the processors 22 through an associated port 38 of one of the switches 12, 14 or 20. The port 38 is hereinafter referred to as a "home port." For ease of understanding the home nodes are depicted as connecting directly to the various central switches 12.

Each processor 22 controls an associated cache 26. In the drawing the processors access their caches directly. Alternatively, the processors may access their respective caches through the group switches 20. A given processor holds in its cache copies of data that the processor requires for its processing operations. In the system, the processors hold data in their caches in the form of one or more blocks.

Several processors 22 may hold copies of the same or overlapping data blocks in their caches 26. Accordingly, the system uses a cache coherency mechanism to ensure that the processors process consistent copies of the data. As part of the cache coherency mechanism, the home node 30 maintains a cache coherency directory 34 that has entries for the respective blocks that are held in the caches 26. For each block, the directory 34 includes in an entry an identifier for the current owner and, as discussed in more detail below, encoded routing information in the form of one or more arbitration masks. As also discussed below, the system encodes the routing information to optimize the multicasting of invalidate messages from the home node to the affected processors. As can be appreciated by those skilled in the art, the update operation may include a write operation, a read/modify operation and so forth, depending on the status of the data at the processor that is to perform the update.

Figure 2:
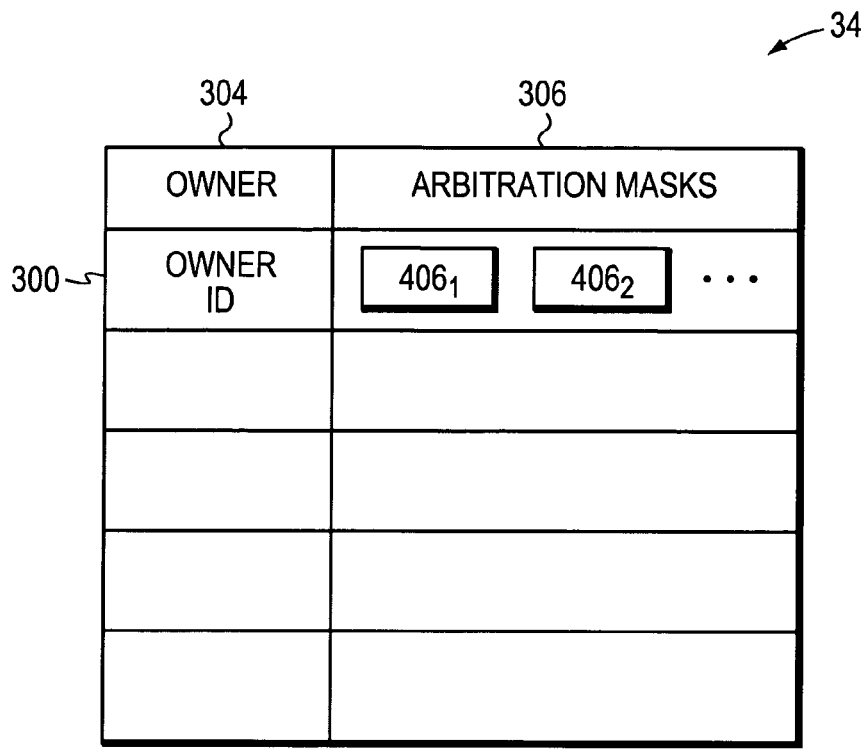
FIG. 2 illustrates a cache coherency directory used in the system of FIG. 1.

Referring now also to FIG. 2, the cache coherency directory 34 includes entries 300 that correspond to the various data blocks that are held in the caches 26. A given entry is indexed by block number and includes in an entry a field 304 that identifies the owner of the block. The entry further includes, in an arbitration mask field 306, one or more arbitration masks 406 that specify all or a portion of the routes from the home node through the switches 12, 14 and/or 20 to the affected processors 22.

Figure 3:
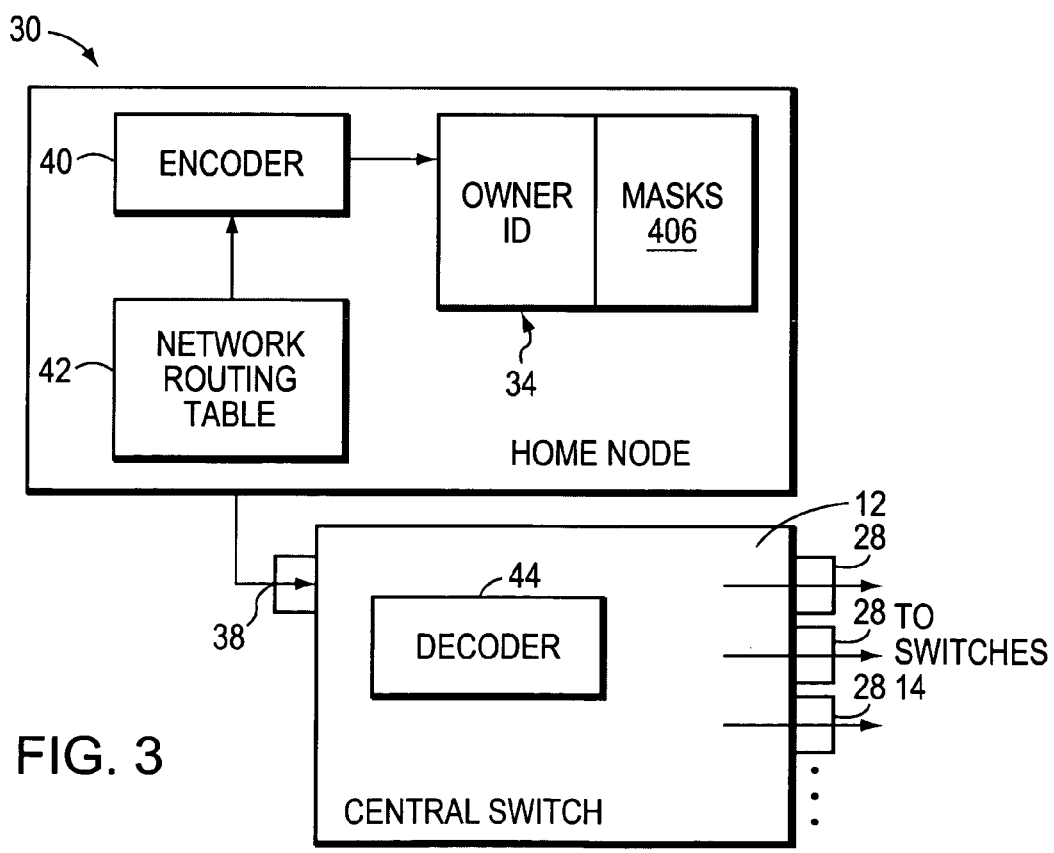
FIG. 3 is a functional block diagram of a home node and a switch that are included in the system of FIG. 1.

Referring now also to FIG. 3, the home nodes 30 each include an encoder 40 that essentially encodes into the arbitration masks 406 all or a portion of the routing information associated with the affected processors. A given mask specifies, for one or more switches, the ports that the switch or switches will use to send invalidate messages to the processors that hold copies of the associated data block. To produce the masks, the encoder enters a network routing table 42 to extract the routing information for the various processors that have requested copies of the associated data. The encoder then translates the routing information into switch port designations, and sets the bits of the masks to specify for each switch or switching layer the switch ports that are on the routes to the affected processors.

The home nodes 30 include the arbitration masks 406 in a routing field of the invalidate message and send the messages to the switch 12 through the associated home port 38. A decoder 44 in the switch decodes the applicable arbitration mask and multicasts the message through the ports 28 that correspond to the set bits of the mask. The intermediate switches 14 similarly decode the applicable masks and direct the message through the indicated switch ports, and so forth, until the message reaches the group switches 20 that are on the routes to the affected processors. Individual group switches may use a local arbitration mask, a local directory and/or routing tables to direct the message to the associated affected processors. Alternatively, the group switches may locally broadcast the message.

Figure 4:
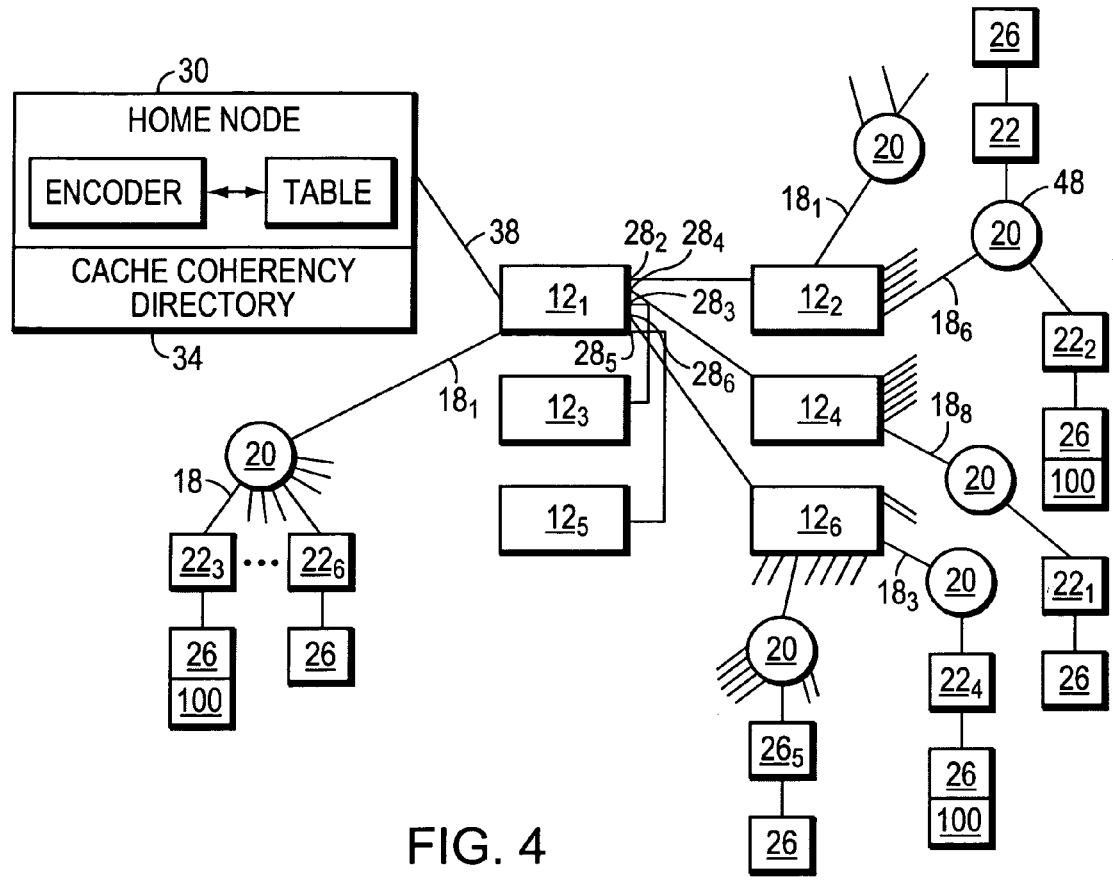
FIG. 4 illustrates a particular example of the system of FIG. 1.

The operation of the cache coherency mechanism is discussed below in conjunction with an example. Referring now to FIG. 4, the central switch 12 includes six interconnected switches $12_1, 12_2 \ldots 12_6$. A given switch $12_i$ connects to each of the other switches $12_j$ through switch ports 28. The switch also connects to eight associated group switches 20 through switch ports 18. Each group switch connects, in turn, to eight associated processors 22 through switch ports 48. The processor $22_3$ is the current owner of the data block and the processors $22_1, 22_2, 22_4$ and $22_7$ hold copies of a data block 100 in their respective caches 26. The associated home node 30, which is connected to the central switch 12 through home port 38 of switch $12_1$, maintains the cache coherency directory 34. For ease of understanding, only certain network connections are depicted in the drawing.

Figure 5:
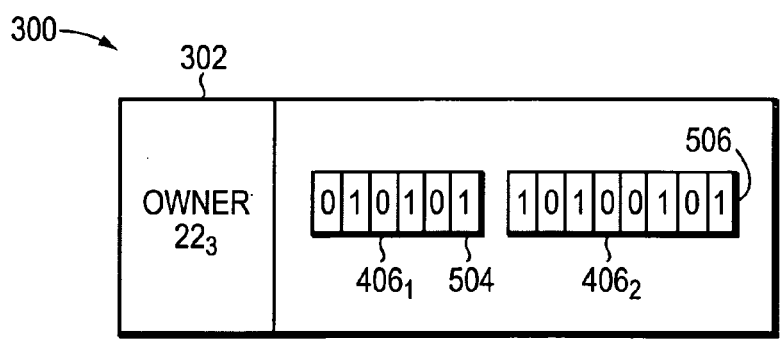
FIG. 5 illustrates a particular example of the directory of FIG. 2.

Referring also to FIG. 5, the directory 34 includes in each entry 300 two levels of arbitration masks 406. The first-level arbitration mask $406_1$ corresponds to routes to the switches $12_2, 12_3 \ldots 12_6$ from the home port 38 of switch $12_1$ (referred to herein also as the "home switch"). The second-level arbitration mask $406_2$ corresponds to routes to the group switches 20 from the central switches $12_i$.

The first-level arbitration mask $406_1$ includes bits 504 that correspond, respectively, to the ports 28 of the home switch $12_1$. Set bits 504 indicate that an invalidate message is to be multicast through the corresponding ports to the other switches $12_i$. The second-level arbitration mask $406_2$ includes bits 506 that correspond, respectively, to the ports 18 that connect the switches $12_i$ to the group switches 20. Set bits 506 indicate that the invalidate message is to be multicast to the associated group switches through the corresponding ports 18.

The second-level arbitration mask $406_2$ may include one bit for each port 18 of every switch $12_i$ and thus can be thought of as a concatenation of multiple individual masks, one for each switch $12_i$. Alternatively, to save storage space at the home node 30, the second-level arbitration mask $406_2$ may be a combined mask with bits 506 that correspond to combinations of the routes through the switches $12_i$. The set bits in the mask then indicates that the message is to be multicast through the corresponding port of every switch $12_i$. A given bit is set if the corresponding port 18 of any one of the switches $12_i$ leads to a group with a processor that has a copy of the data. Accordingly, the message may be sent to one or more groups that do not include affected processors. The system thus trades off reduced storage space associated with storing a combined mask against the increase in messaging.

In the example, the directory entry 300 for the data block 100 identifies the processor $22_3$ as the owner of the block in an owner field 304. The entry also includes an arbitration mask $406_1$ with set bits $504_2, 504_4$ and $504_6$ that correspond to the ports 28 that are on the routes from the home switch $12_1$ to the affected processors $22_1, 22_2, 22_4$ and $22_7$. The entry further includes an arbitration mask $406_2$ that has set bits $506_1, 506_3, 506_6$ and $506_8$ that correspond to a combination of the various ports 18 on the routes from the switches $12_i$ to the affected processors.

Figure 6:
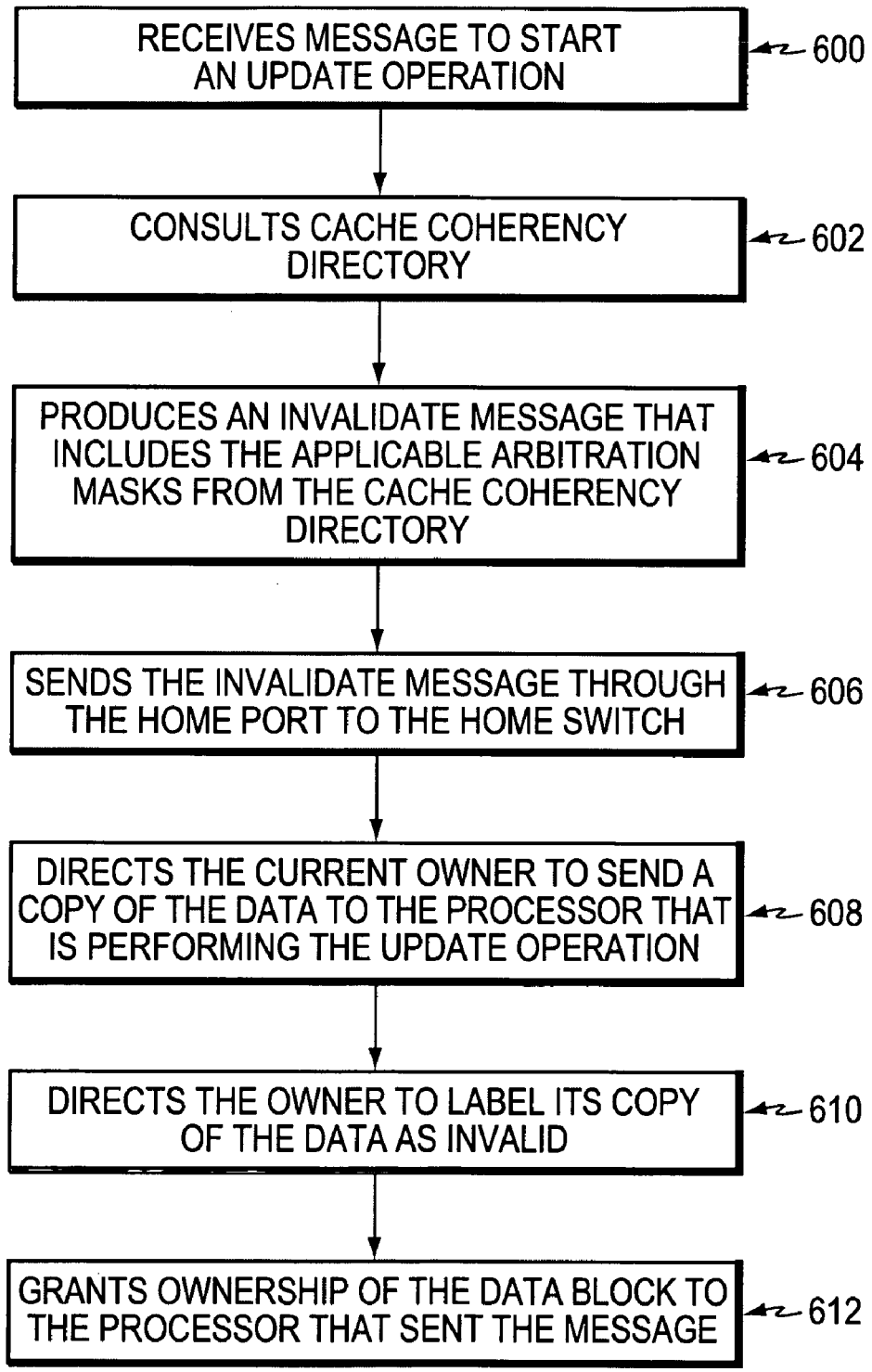
FIG. 6 is a flow chart of the operations of the home node during an update operation.

Referring also to FIG. 6, the processor $22_4$ is to perform an update operation to the data block 100. The processor determines from the address of the data block which home node 30 is associated with the data and sends a message to the home node to start the update operation. If the processor $22_4$ has a valid copy of the data, the processor sends a message that indicates a write operation. Otherwise, the processor sends a message that indicates a read/modify operation. The processor $22_4$ is not the owner, and thus, it is likely than not that the processor will not have a valid copy of the data.

When the home node 30 receives the message from the processor $22_4$ (step 600), the home node enters the cache coherency directory 34 (step 602) and produces an invalidate message that includes the arbitration masks $406_6$, from the directory entry 300 for the data block 100 (step 604). The home node then sends the invalidate message over the home port 38 to the home switch $12_1$ (step 606). The home switch decodes the first-level mask $406_1$ and multicasts the message to the other switches $12_i$ through the ports 28 that correspond to the set bits $504_2, 504_4$ and $504_6$ of the mask. Thereafter, the switches $12_i$ decode the second-level arbitration mask $406_2$ and direct the message through the ports 18 that correspond to the set bits $506_1, 506_3, 506_6$ and $506_8$. When the group of switches 20 receives the message, they consult their respective directories and/or routing tables to, as appropriate, direct the messages to the affected processors. Certain groups receive the message even though none of the affected processors are contained therein. These groups may simply ignore the messages. Alternatively, each group switch may locally broadcast the message, with the unaffected processors ignoring the message.

The home node directs the owner $22_3$ to send a copy of its data block 100 to the processor $22_4$ and also to then label its own copy as invalid (steps 608, 610). The home node then grants ownership of the data block 100 to processor $22_4$ (step 612). The owner-processor may then update its copy of the data block 100.

As discussed above, the encoder 42 (FIG. 3) encodes the routing information that relates to the affected processors 22 into the bits of the arbitration masks 406. The encoder thus sets the bits of the masks to correspond to particular ports of the various switches that are on the routes from the home port to the affected processors. In systems in which the processors communicate through routers or other types of switching devices, the encoder similarly encodes into the arbitration masks information that specifies the paths through the various devices that are on the routes to the processors. As also discussed, the arbitration masks correspond to the various layers in the network, with a given mask preferably relating to one of the layers.

The encoder, as necessary, produces a new set of arbitration masks 406 each time an additional processor 22 requests a copy of a data block or relinquishes a copy of a data block. The encoder may newly encode the routing information for all of the affected processors, if the home node maintains a list of the processors. Alternatively, the encoder may instead alter the masks based on any changes to the set of affected groups, that is, alter the masks if the processor requesting a copy of the data is in a group that did not previously include an affected processor or if the processor relinquishing the data is the only affected processor in a given group. Otherwise, the changes are reflected locally, for example, in the local group directories.

Instead of switch port designations the masks may include indicia from which the switching devices can readily ascertain applicable routes to the affected processors by, for example, simple manipulation of the bits and/or using the bits to enter optimized routing tables. The masks thus allow the switching devices to determine the routes for the multicast transmission without having to enter the larger network routing tables and incur the associated delays.

What is claimed is:

1. A method of operating a cache coherency mechanism for a computer system that includes multiple processors, the method comprising:
   determining which processors have copies of data of interest;
   determining paths through various switching devices on routes from an associated home node to the processors that have copies of the data of interest;
   encoding information that is indicative of the paths into one or more masks;
   when the data of interest is the subject of an update operation, producing at the home node an invalidate message that includes the masks;
   at one or more of the switching devices, decoding the applicable masks and routing the invalidate message over the paths indicated by the decoded information; and
   at the switching devices that connect to the processors, forwarding the invalidate message to the processors that have copies of the data of interest.

2. The method of claim 1, wherein the encoding includes setting bits in a given mask to indicate paths from a corresponding switching device to a next switching device on the routes to the processors.

3. The method of claim 2, wherein the encoding further includes setting the bits to correspond to a combination of the paths through a plurality of switching devices.

4. The method of claim 2, wherein the encoding further includes setting bits that correspond to ports of the respective switching devices.

5. The method of claim 1 wherein the encoding further includes
   separately encoding into a first mask information relating to paths through the switching device that is associated with the home node,
   encoding into one or more second masks information relating to paths through the switching devices that connect to the switching device of said separately encoding into a first mask,
   encoding into one or more additional masks information relating to paths through the switching devices that connect to the switching devices of said encoding into one or more second masks, and
   repeating said encoding into one or more additional masks for paths through additional switching devices.

6. A method of operating a cache coherency mechanism for a computer system that includes multiple processors which are interconnected by layers of switching devices, the method comprising:
   determining which processors have copies of data of interest;
   determining paths through various switching devices on routes from a home node to the processors that have copies of the data of interest;
   encoding information that is indicative of the paths through a highest layer of the system into a first mask;
   encoding information that is indicative of the paths through a next highest layer of the system into a next mask;
   repeating said encoding information that is indicative of the paths through a next highest layer for the remaining layers of the system;
   when the data of interest is the subject of an update operation, producing at the home node an invalidate message that includes the masks;
   at the switching devices in the highest layer, decoding the first mask and routing the invalidate message over the indicated paths;
   at the switching devices in the remaining layers, decoding the corresponding masks and routing the invalidate message over the indicated paths through the layers; and
   at switching devices that connect to the processors of interest, forwarding the invalidate message to the processors.

7. The method of claim 6, wherein the first and second encoding include setting bits in a given mask to indicate one or more paths from a corresponding switching device to one or more switching devices in a next layer of the system.

8. The method of claim 7, wherein the first and second encoding further include setting bits that correspond to ports of the switching devices.

9. The method of claim 6, wherein the first and second encoding further include setting the bits to correspond to a combination of the paths through a plurality of switching devices in a given layer of the system.

10. The method of claim 6 wherein the highest layer includes one or more switching devices that receive messages from the home node.

11. A computer system comprising:
    a plurality of processors, with one or more processors designated as home nodes;
    a plurality of switching devices that interconnect the processors;
    one or more encoders for encoding into one or more masks information relating to paths through the switching devices from an associated home node to the processors that have data of interest;
    a cache coherency directory with entries for data of interest, the directory including in a given entry
      information that identifies the owner of the data, and
      one or more associated masks; and
    one or more decoders at the switching devices, the decoder in a given switching device decoding an associated mask to set paths through the switching device for messages directed from the home node to processors that have copies of the associated data of interest.

12. The computer system of claim 11 wherein the plurality of switching devices are organized into layers with one or more switching devices in a highest layer connected to transmit messages from the home node, one or more switching devices in a next highest layer connected to transmit messages from the one or more switching devices in the highest layer to the switching devices in a lower layer, one or more switching devices in lower layers connected to transmit messages from the switching devices in preceding levels to switching devices in subsequent layers, and one or more switching devices in a lowest level connected to transmit messages to the processors, and the masks relate, respectively, to paths through the switching devices in the associated layers.

13. The computer system of claim 12 wherein one or more of the masks relate to combinations of the paths through the switching devices in the associated layers.

14. The computer system of claim 12 wherein the switching devices are switches and the masks designate port of the associated switches.

15. The computer system of claim 11 wherein a given home node produces messages directed to processors that have copies of date of interest and includes in the messages the associated masks.

16. The computer system of claim 15 wherein the switches that connect to the processors use local routing information to provide the messages to the associated processors that have copies of the data of interest.

17. The computer system of claim 15 wherein the switches that connect to the processors locally broadcast the messages to the associated processors.

* * * * *

UNITED STATES PATENT AND TRADEMARK OFFICE
CERTIFICATE OF CORRECTION

PATENT NO. : 6,961,825 B2
APPLICATION NO. : 09/768418
DATED : November 1, 2005
INVENTOR(S) : Simon C. Steely, Jr. et al.

It is certified that error appears in the above-identified patent and that said Letters Patent is hereby corrected as shown below:

On the title page, item (75), in "Inventors", in column 1, line 4, delete "Shrewsbury, MA (US)" and insert -- Marlboro, MA (US) --, therefor.

Signed and Sealed this

Twenty-eighth Day of July, 2009

JOHN DOLL
*Acting Director of the United States Patent and Trademark Office*